US008650656B1

(12) United States Patent
Aboujaoude et al.

(10) Patent No.: US 8,650,656 B1
(45) Date of Patent: Feb. 11, 2014

(54) METHOD AND APPARATUS FOR USER AUTHENTICATION

(75) Inventors: Roger Aboujaoude, Ocean Township, NJ (US); Matthew Bush, Millstone Township, NJ (US); Hossein Eslambolchi, Los Altos Hills, CA (US); Michael L. Morris, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1541 days.

(21) Appl. No.: 11/589,550

(22) Filed: Oct. 30, 2006

(51) Int. Cl.
*G06F 7/04* (2006.01)

(52) U.S. Cl.
USPC ............... 726/27; 726/28; 726/29; 726/30

(58) Field of Classification Search
USPC ............ 726/27–30, 260–30; 713/155–156, 713/182–185
See application file for complete search history.

(56) References Cited

U.S. PATENT DOCUMENTS

| | | | |
|---|---|---|---|
| 6,339,830 B1 * | 1/2002 | See et al. | 726/15 |
| 7,421,735 B2 * | 9/2008 | Kerstens et al. | 726/12 |
| 7,665,127 B1 * | 2/2010 | Rao et al. | 726/9 |
| 7,711,832 B1 * | 5/2010 | Champion et al. | 709/228 |
| 2002/0032665 A1 * | 3/2002 | Creighton et al. | 705/76 |
| 2003/0193390 A1 * | 10/2003 | Muramatsu | 340/426.13 |
| 2003/0200432 A1 * | 10/2003 | Washio | 713/168 |
| 2004/0064719 A1 * | 4/2004 | de Jong et al. | 713/200 |
| 2006/0230459 A1 * | 10/2006 | Lam | 726/26 |
| 2009/0119182 A1 * | 5/2009 | Krstulich et al. | 705/26 |
| 2009/0163176 A1 * | 6/2009 | Hasegawa | 455/411 |

* cited by examiner

*Primary Examiner* — Eleni Shiferaw
*Assistant Examiner* — Phy Anh Vu

(57) ABSTRACT

A method and system for authenticating access to a protected application are disclosed. For example, the method receives from a protected application a request by a user to gain access to the protected application. In one embodiment, the request contains an identification of the user and an identification of at least one media device of the user. The method then verifies the identification of the user and the identification of at least one media device of the user, e.g., via a database operated by a proxy server. The method then generates an access code if the identification of the user and the identification of at least one media device are verified. Finally, the method sends the access code to both the user and to the protected application.

12 Claims, 3 Drawing Sheets

METHOD AND APPARATUS FOR USER AUTHENTICATION

BACKGROUND OF THE INVENTION

1. Field of the Invention

The present invention generally relates to a field of security enhancements in computer networks and, in particular, to a method and apparatus for authenticating a user of a computer network.

2. Description of the Related Art

Security token devices, such as smart cards and the like, are commonly used to authenticate the user of protected network services. For example, in operation, a user who wishes to access a protected network service will need to enter a security token, often displayed on a security token device. The security token for each user is changed frequently, e.g., usually every few minutes. However, since the security token device and the system providing the protected network service are synchronized, both the security token device and the system will be in agreement as to what is the current security token that will allow the user to access the protected network service.

However, as the number of users of the protected network services increases, administration and maintenance of a growing fleet of the security token devices (e.g., issue of new devices, replacement of lost/damaged devices, etc.) becomes a complex and expansive process. Additionally, a user may need more than one token device to obtain access to different protected services.

Therefore, there is a need in the art for an improved method and apparatus for user authentication.

SUMMARY OF THE INVENTION

In one embodiment, the present invention provides a method and system for authenticating access to a protected application. For example, the method receives from a protected application a request by a user to gain access to the protected application. In one embodiment, the request contains an identification of the user and an identification of at least one media device of the user. The method then verifies the identification of the user and the identification of at least one media device of the user, e.g., via a database operated by a proxy server. The method then generates an access code if the identification of the user and the identification of at least one media device are verified. Finally, the method sends the access code to both the user and to the protected application. Thus, once the user enters the access code to the protected application, the user will be authenticated and the access to the protected application will be granted.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION

The present invention is generally a method and apparatus for user authentication for accessing protected network services, e.g., a protected application on a server coupled to a computer network, such as the Internet, Intranet, and the like. The present invention advantageously allows a user to be authenticated without a need in carrying and using a security token device, such as a Smart Card, and the like.

Hereafter, similar functional devices are identified using the same numeric references, except that the suffixes may be added, when appropriate, to differentiate between the specific devices.

Figure 1:
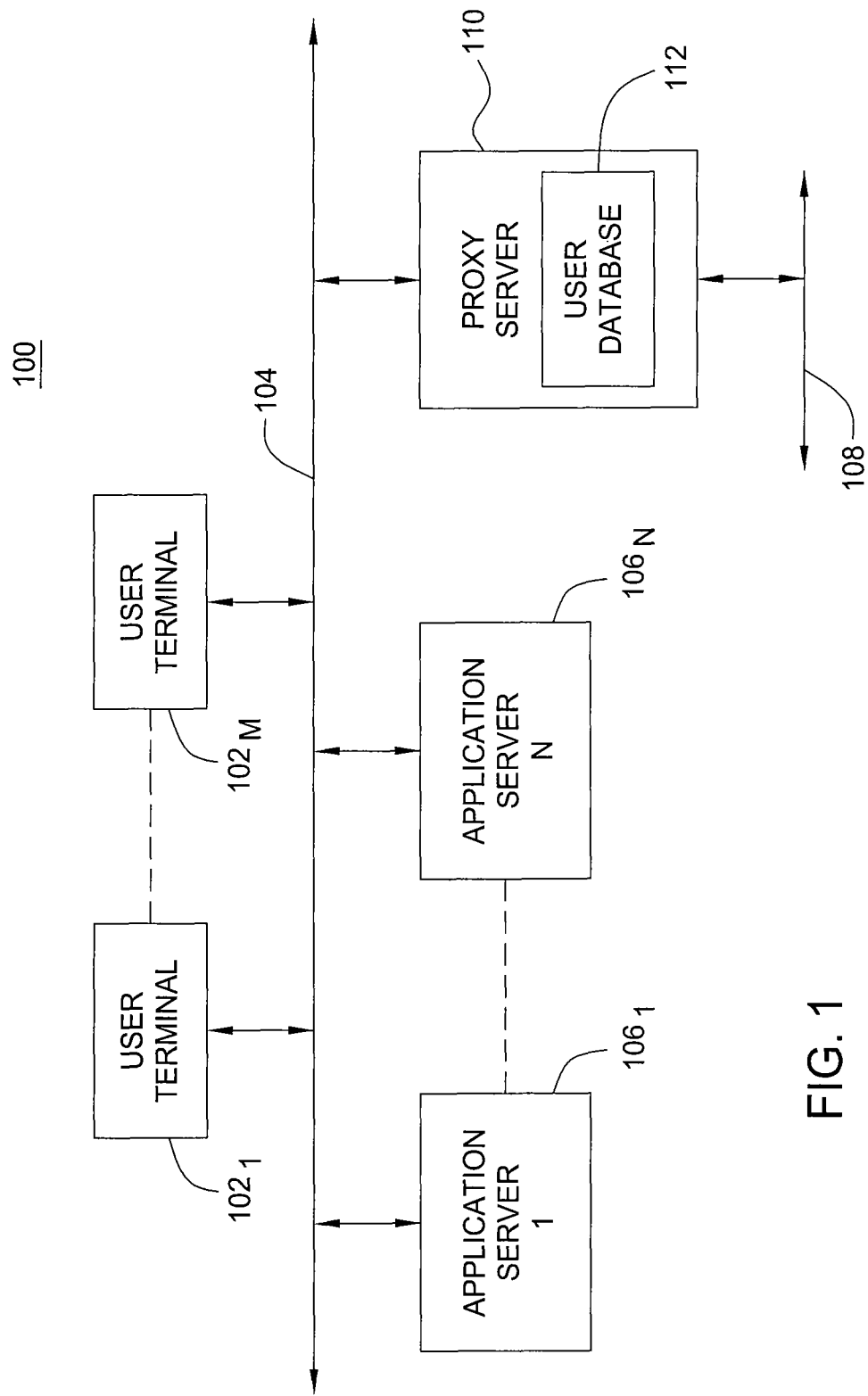
FIG. 1 depicts a high-level block diagram of an exemplary system for user authentication according to one embodiment of the present invention.

FIG. 1 depicts a high-level block diagram of an exemplary system 100 for user authentication according to one embodiment of the present invention. In one embodiment, the system 100 comprises M user terminals $102_{1-M}$, N application servers $106_{1-N}$, and a proxy server 110, where M and N are integers and M, N≥1. The user terminals (generically referred to as 102), application servers (generically referred to as 106), and proxy server 110 are coupled to a computer network 104, such as the Internet, Intranet, and the like. Each application server 106 contains at least one application, e.g., a protected application, which may be accessed only by the user that has been positively authenticated.

In one embodiment, the proxy server 110 is a stand-alone trusted server (i.e., a secured server) that contains a database 112 of information of the users that, upon successful authentication, may be granted access to the protected applications. In one embodiment, the authentication information for each user may include the user's login information (e.g., user's name, or Principal ID), a listing of the user's contact medium and user's contact information. To administer the database 112, the proxy server 110 may optionally be coupled, either temporarily or permanently, to a private network 108 (e.g., an Intranet). For example, the proxy server 110 can be operated by a network service provider, whereas the application servers 106 can be enterprise customers of said network service provider. As such, the present invention can be implemented by a network service provider as a service feature offered to its customers.

The user's contact medium comprises a list of user's media devices (or broadly communication devices) that can be used to reach the user. Illustratively, the user's media devices may include a wired phone, a mobile phone, a pager, a desktop computer, a laptop computer, a personal digital assistant (PDA), and the like. Correspondingly, the user's contact information includes one or more phone numbers, pager numbers, and/or e-mail addresses associated with the user's media devices.

In one illustrative embodiment, the computer network 104 is the Internet. In this embodiment, a user terminal 102 is generally a computer running a program (i.e., a software application) that can access the Internet 104 and protected applications, e.g., contained on the server(s) 106. When the user attempts to access a protected application, the user initiates a user authentication routine. When the user is authenticated, then the user may gain access to the protected application. In accordance with the present invention, the user may gain access to a plurality of protected applications via a secure single login process as discussed below.

Figure 2:
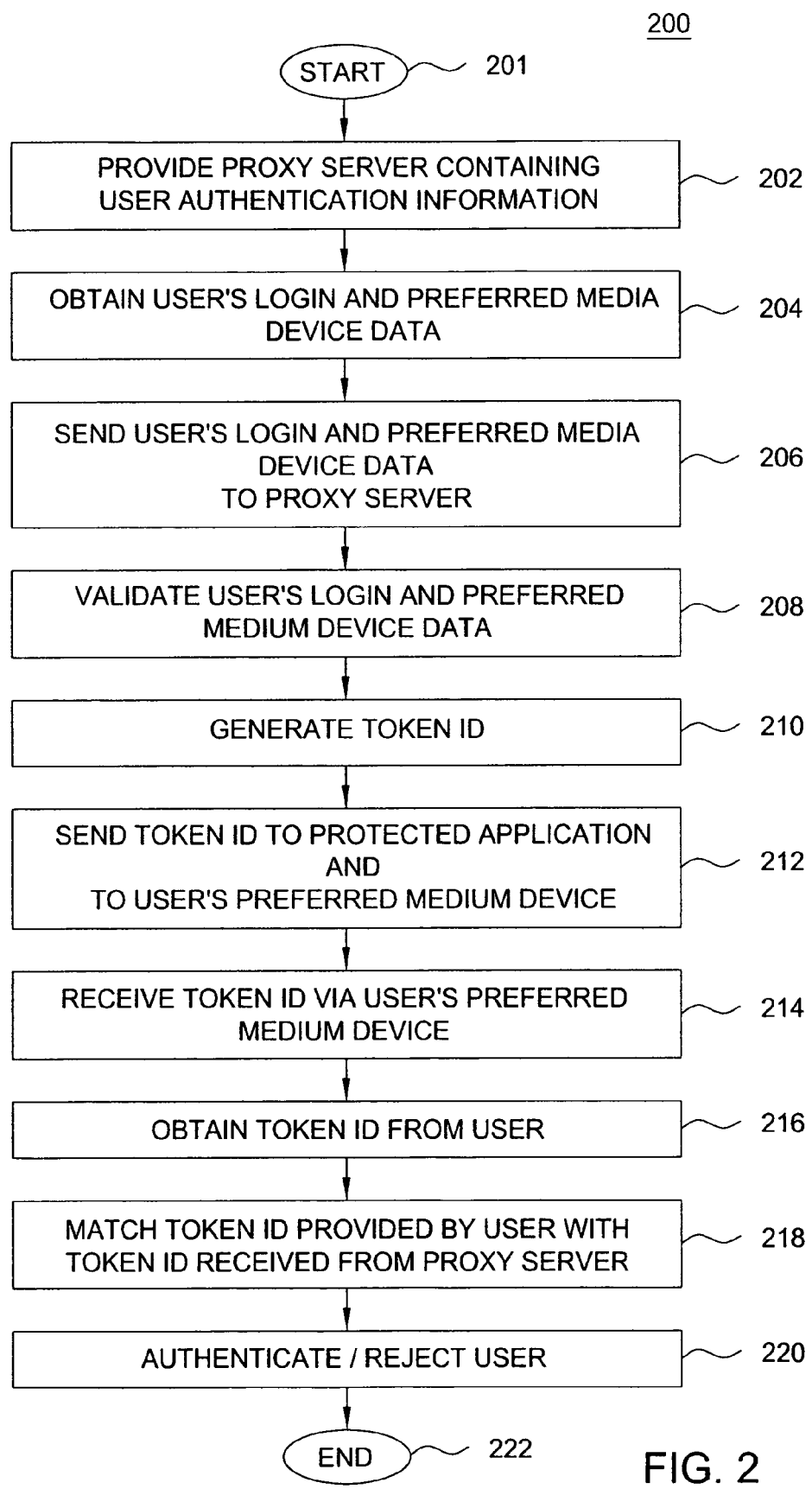
FIG. 2 depicts a flow diagram of a method for user authentication according to one embodiment of the present invention.

FIG. 2 depicts a flow diagram of a method 200 for user authentication using according to one embodiment of the present invention. For better understanding of the invention, the reader should simultaneously refer to FIGS. 1 and 2.

The method 200 starts at step 201 and proceeds to step 202. At step 202, there is provided a proxy server 110 that is coupled to a computer network (e.g. Internet) 104. The proxy server 110 contains the database 112 of user authentication information including but not limited to the user's login information, a listing of the user's contact medium and user's contact information. For example, a user may access a website and provides the necessary authentication information to the proxy server.

At step 204, using one of the user terminals 102, a user may attempt to access a protected application (e.g., via a website) located on an application server 106. The application server prompts the user to submit the user's login information (e.g., a user name, or a Principal ID) and to select a preferred media device (e.g., a phone, a pager, a computer, and the like) that the user will use to receive the token ID (or more broadly, an access code). It should be noted that the user may select a preferred media device by simply providing a phone number to the user's land line, a phone number to the user's mobile phone, a phone number to the user's pager and so on. It should be noted that selecting a preferred media device is broadly interpreted as providing an identification of the media device of the user. Furthermore, the user may optionally provide more than one preferred media device.

At step 206, the application server sends the submitted user's login information and the choice (i.e., type) of the preferred media device to the proxy server 110.

At step 208, the proxy server 110 performs an authentication or validation of the data received from the application server against information contained in the database 112. For example, the validation process first compares the user provided login information via the database 112 to determine whether the user is authorized to access the protected application. If a match is not confirmed, then the proxy server 110 sends a message to the application server that causes the application server to reject the request of the user. If the user is listed as a user who is authorized to access the protected application, then the validation process proceeds to determine whether the preferred media device matches a previously defined media device that is associated with the user. For example, if the user provided the system with the user's cellular phone number, then the validation process will verify whether the provided phone number matches with at least one phone number that is associated with the user. If a match is not confirmed, then the proxy server 110 sends a message to the application server that causes the application server to reject the user's request. If a match is confirmed, then the user's login information and the choice of the preferred media device are validated.

At step 210, the proxy server 110 generates a security token, or Token ID (or more broadly, an access code), for the user. Generally, the Token ID is a unique random numeric string or, alternatively, an alphanumeric string. A new Token ID is generated for each request for accessing the protected application and is valid for a limited period of time, e.g., about 1-5 minutes and so on.

At step 212, the proxy server 110 sends the Token ID to the protected application running On the application server and to the specified media device of the user that has passed the validation process of step 208. In another embodiment, the Token ID may be sent by a remote apparatus, e.g., a transmitter, a router, and so on (not shown) operating under control of the proxy server 110.

At step 214, the user receives, at the preferred media device, the Token ID that has been sent by the proxy server 110. When the preferred media device is an analog phone, the Token ID may be sent in a form of a voice message. When the preferred media device is a digital phone or a pager, the Token ID may be sent in a form of a voice message and/or a numeric or alphanumeric text message. Accordingly, when the preferred media device comprises a modem (e.g., computer, PDA, mobile phone, and the like), the Token ID may be sent in a form of an e-mail message or an instant messaging (IM) message. In this case, the Token ID may be retrieved, at the user's e-mail address.

At step 216, the protected application prompts the user to enter the Token ID in a dedicated field (e.g., "Security ID", and the like) of the login screen. The user is requested to complete the entry within a pre-determined time interval, e.g., about 1-5 minutes. Shorter time intervals for the Token ID (i.e., a shorter life time) can be set to reduce probability of an unauthorized access to the protected application. However, it may also prevent the user from performing an error-free entry of the Token ID.

At step 218, the protected application verifies a match between the Token ID received, at step 212, from the proxy server 110 and the one that was obtained, at step 216, from the user.

At step 220, if the match between the Token IDs is not confirmed, the user's request to access the protected application is rejected. Correspondingly, when the match is confirmed, the user is positively authenticated and granted the access to the protected application. In another embodiment, the authenticated user may be granted access to a plurality of applications that share the same authentication requirements. At step 222, the method 200 ends.

Thus, the present invention provides a secure single log-in through a trusted proxy server for accessing one or more protected applications. The user may simply repeat the same log-in procedure to obtain another access code to another protected application and so on. Namely, there is no need to issue the user with a plurality of security token devices for accessing a plurality of protected applications.

Figure 3:
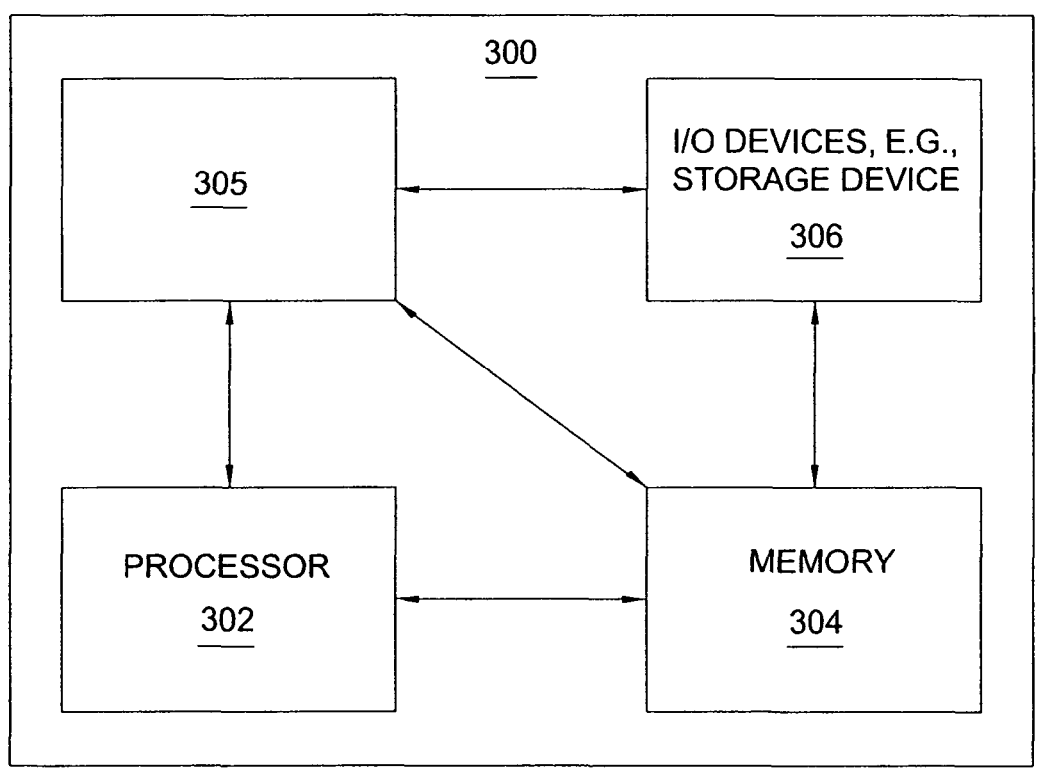
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for authenticating a user, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present authenticating module or process 305 can be loaded into memory 304 and executed by processor 302 to implement the functions as discussed above. As such, the present authentication process 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for authenticating access to a protected application, comprising:
   receiving, by a proxy server, from an application server hosting the protected application a request by a user to gain access to the protected application, wherein the request contains an identification of the user and an identification of a media device of the user, wherein the identification of the user and the identification of the media device of the user are provided to the application server by the user, wherein the proxy server and the application server are separate devices;
   verifying, by the proxy server, the identification of the user and the identification of the media device of the user;
   generating, by the proxy server, an access code if the identification of the user and the identification of the media device of the user are verified; and
   sending, by the proxy server, the access code to the media device of the user and to the application server.

2. The method of claim 1, further comprising:
   requesting the user to provide the access code to the protected application.

3. The method of claim 1, further comprising:
   comparing an access code received from the user with the access code generated by the proxy server; and
   allowing the user to access the protected application if a match is detected in the access code received from the user and the access code received from the proxy server.

4. The method of claim 1, wherein the media device comprises a mobile phone.

5. The method of claim 1, wherein the access code is valid for a predefined period of time.

6. A non-transitory computer-readable medium storing instructions which, when executed by a processor of a proxy server, cause the processor to perform operations for authenticating access to a protected application, the operations comprising:
   receiving from an application server hosting the protected application a request by a user to gain access to the protected application, wherein the request contains an identification of the user and an identification of a media device of the user, wherein the identification of the user and the identification of the media device of the user are provided to the application server by the user, wherein the proxy server and the application server are separate devices;
   verifying the identification of the user and the identification of the media device of the user;
   generating an access code if the identification of the user and the identification of the media device of the user are verified; and
   sending the access code to the media device of the user and to the application server.

7. The non-transitory computer-readable medium of claim 6, further comprising:
   requesting the user to provide the access code to the protected application.

8. The non-transitory computer-readable medium of claim 7, wherein the access code is generated and sent by the proxy server.

9. The non-transitory computer-readable medium of claim 6, further comprising:
   comparing an access code received from the user with the access code generated by the proxy server; and
   allowing the user to access the protected application if a match is detected in the access code received from the user and the access code received from the proxy server.

10. The non-transitory computer-readable medium of claim 6, wherein the media device comprises a mobile phone.

11. The non-transitory computer-readable medium of claim 6, wherein the access code is valid for a predefined period of time.

12. A device for authenticating access to a protected application, comprising:
   a hardware processor of a proxy server; and
   a computer-readable medium storing instructions which, when executed by the hardware processor, cause the hardware processor to perform operations, the operations comprising:
   receiving from an application server hosting the protected application a request by a user to gain access to the protected application, wherein the request contains an identification of the user and an identification of a media device of the user, wherein the identification of the user and the identification of the media device of the user are provided to the application server by the user, wherein the proxy server and the application server are separate devices;
   verifying the identification of the user and the identification of the media device of the user;
   generating an access code if the identification of the user and the identification of the media device of the user are verified; and
   sending the access code to the media device of the user and to the application server.

* * * * *